(No Model.)  4 Sheets—Sheet 1.

G. A. FULLERTON.
MACHINE FOR MOLDING HEEL STIFFENERS.

No. 325,797. Patented Sept. 8, 1885.

Witnesses.
Lauritz N. Möller.
John R. Snow.

Inventor.
George A. Fullerton (No Model.)

G. A. FULLERTON.
MACHINE FOR MOLDING HEEL STIFFENERS.

4 Sheets—Sheet 2.

No. 325,797. Patented Sept. 8, 1885.

Witnesses.
Lauritz W. Möller.
John A. Snow.

Inventor.
George. A. Fullerton (No Model.) 4 Sheets—Sheet 3.

G. A. FULLERTON.
MACHINE FOR MOLDING HEEL STIFFENERS.

No. 325,797. Patented Sept. 8, 1885.

Witnesses
Lauritz W. Möller
John R. Snow

Inventor
George A. Fullerton (No Model.) 4 Sheets—Sheet 4.
G. A. FULLERTON.
MACHINE FOR MOLDING HEEL STIFFENERS.
No. 325,797. Patented Sept. 8, 1885.
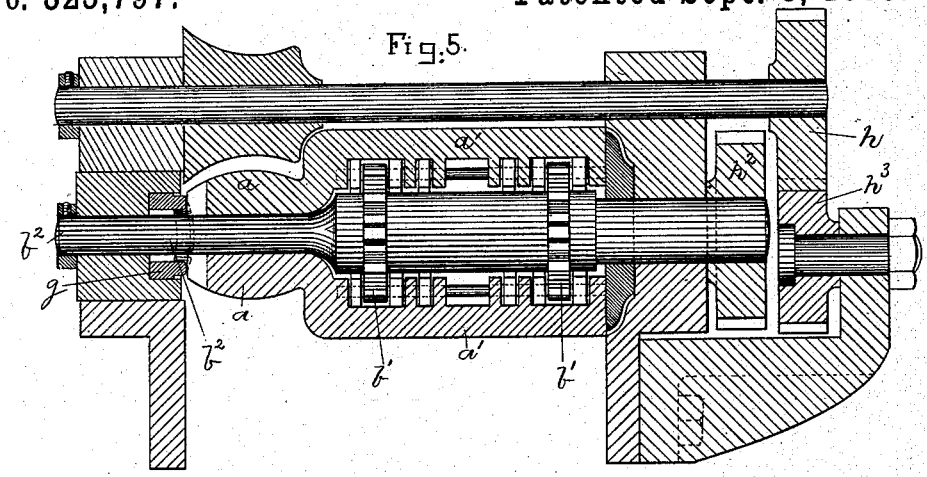
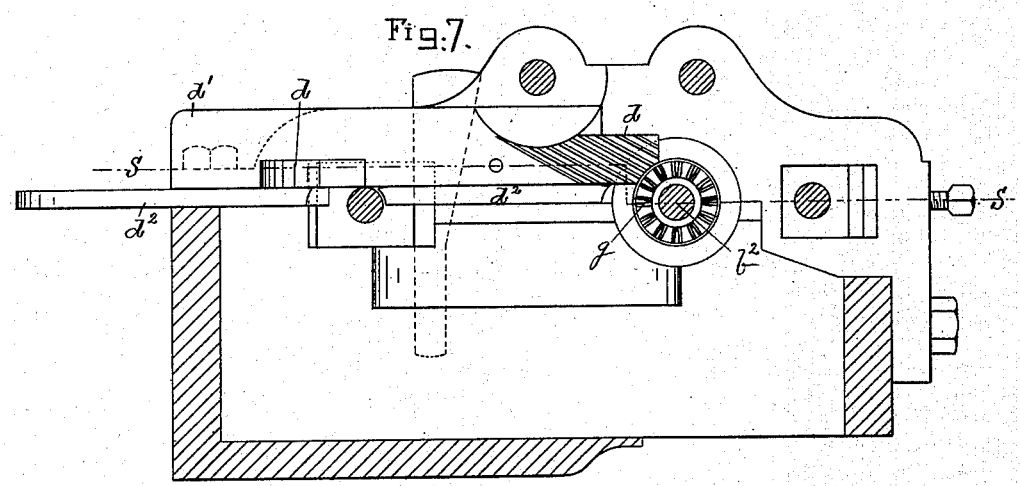
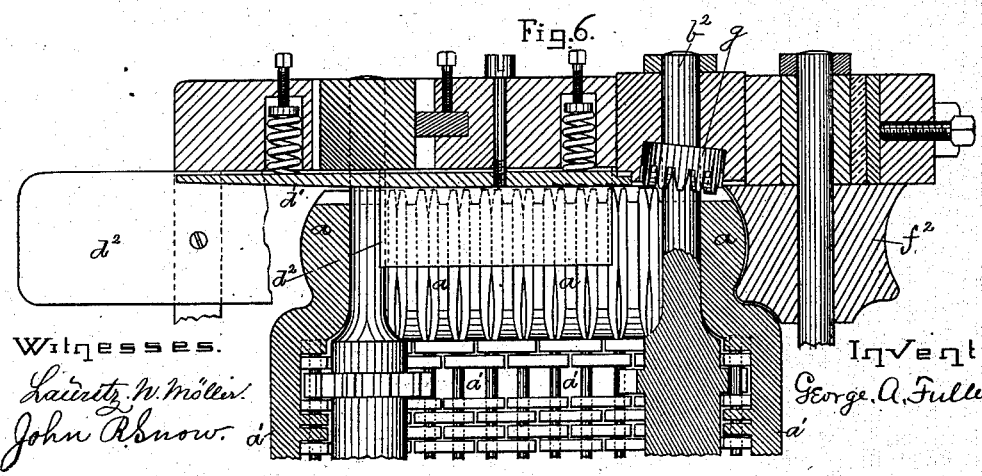
Witnesses.
Lauritz W. Möller
John A. Snow
Inventor.
George A. Fullerton

UNITED STATES PATENT OFFICE.

GEORGE A. FULLERTON, OF BOSTON, MASSACHUSETTS.

MACHINE FOR MOLDING HEEL-STIFFENERS.

SPECIFICATION forming part of Letters Patent No. 325,797, dated September 8, 1885.

Application filed February 7, 1885. (No model.)

*To all whom it may concern:*

Be it known that I, GEORGE A. FULLERTON, of Boston, in the county of Suffolk and State of Massachusetts, have invented a new and useful Machine for Molding Heel-Stiffeners and other Like Articles, of which the following is a specification, reference being had to the accompanying drawings, making a part hereof, in which—

Figure 1:
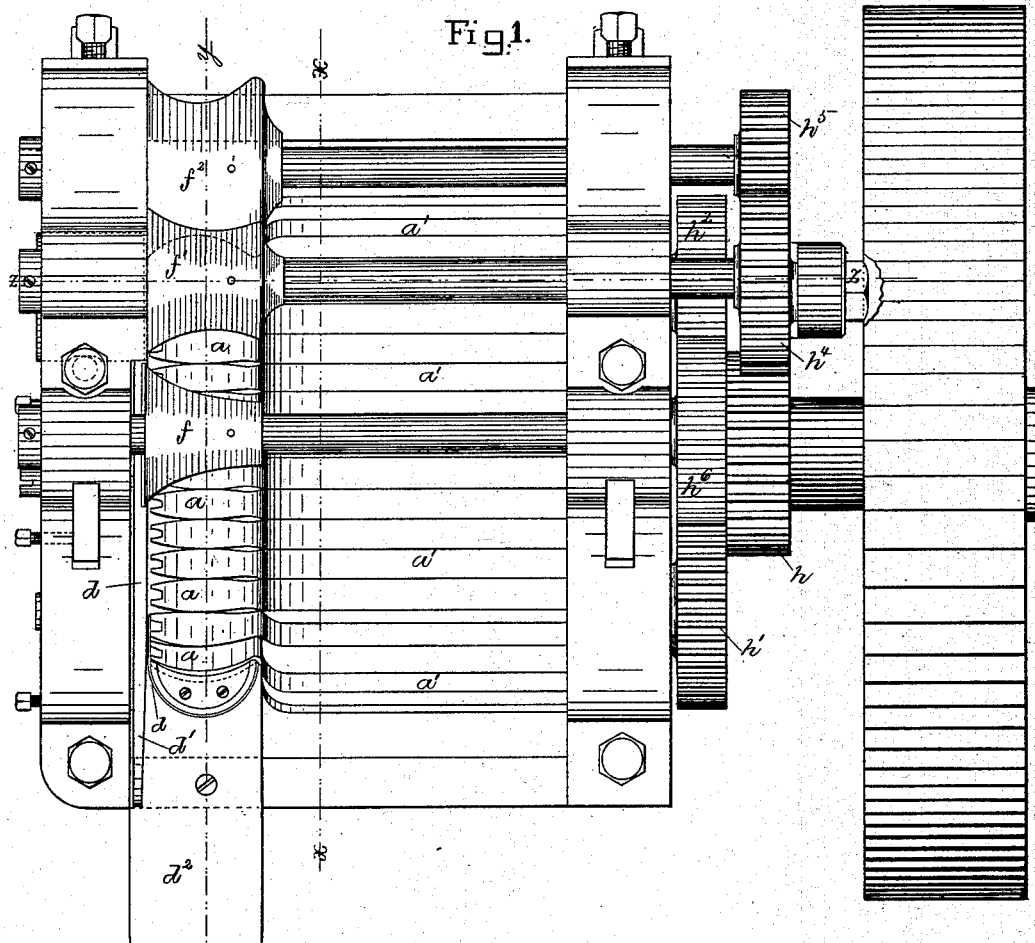
Figure 8:
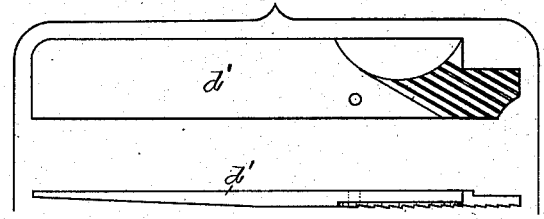
Figure 2:
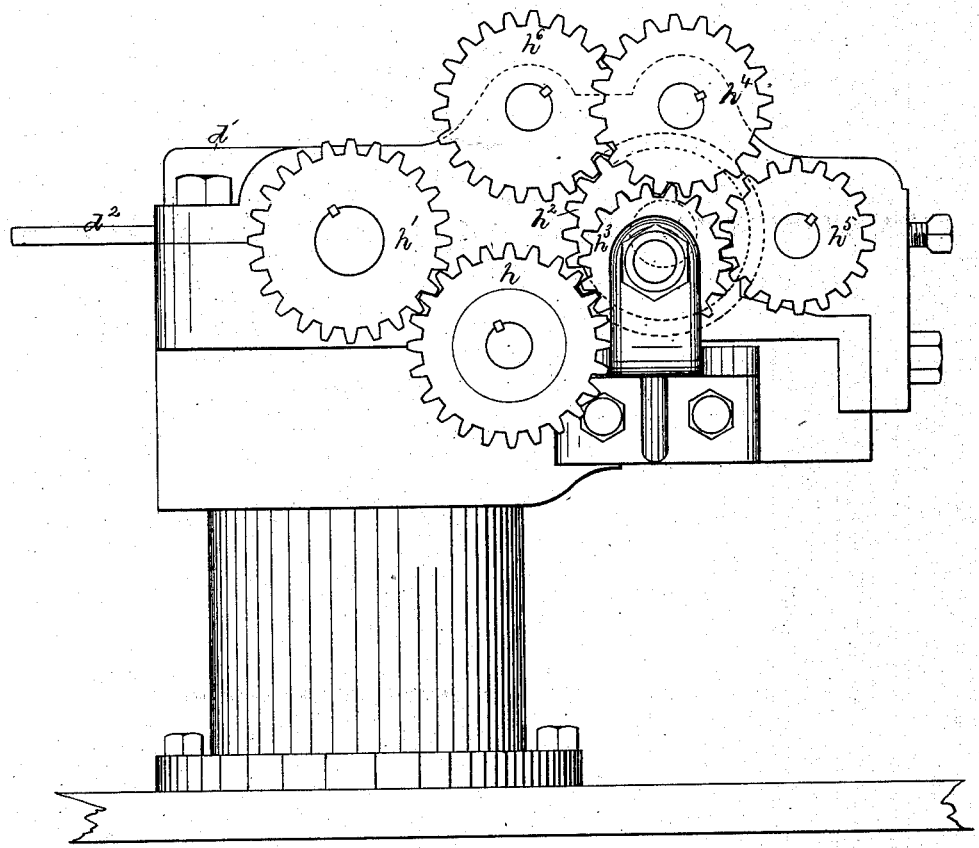
Figure 3:
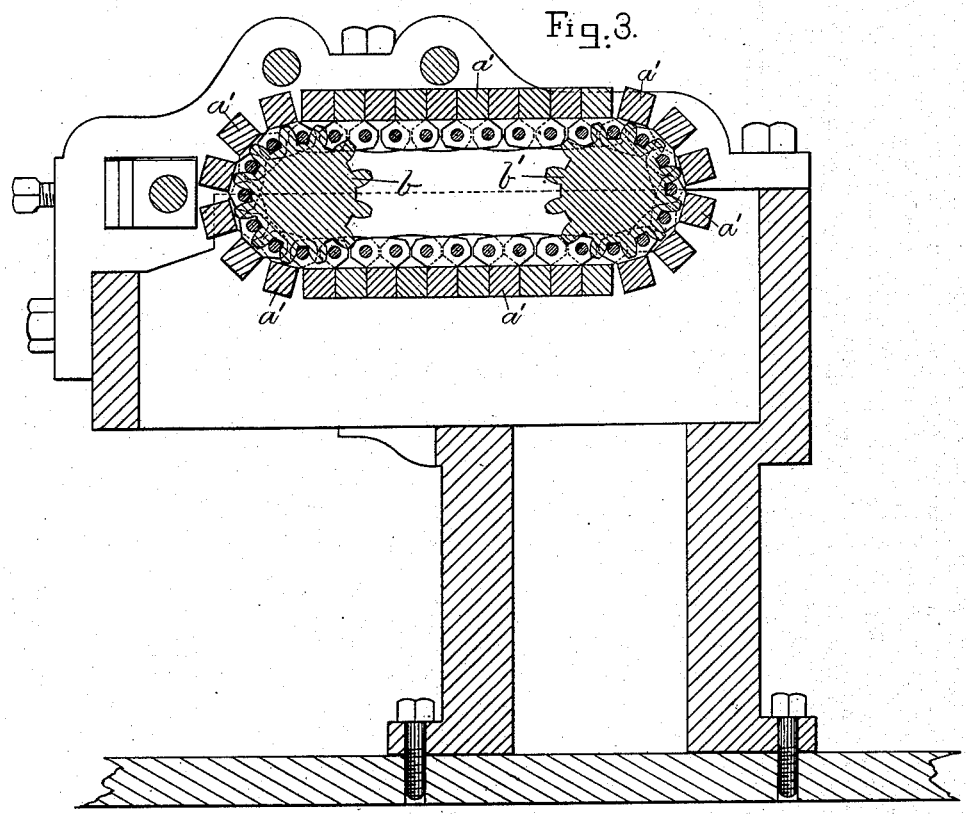
Figure 4:
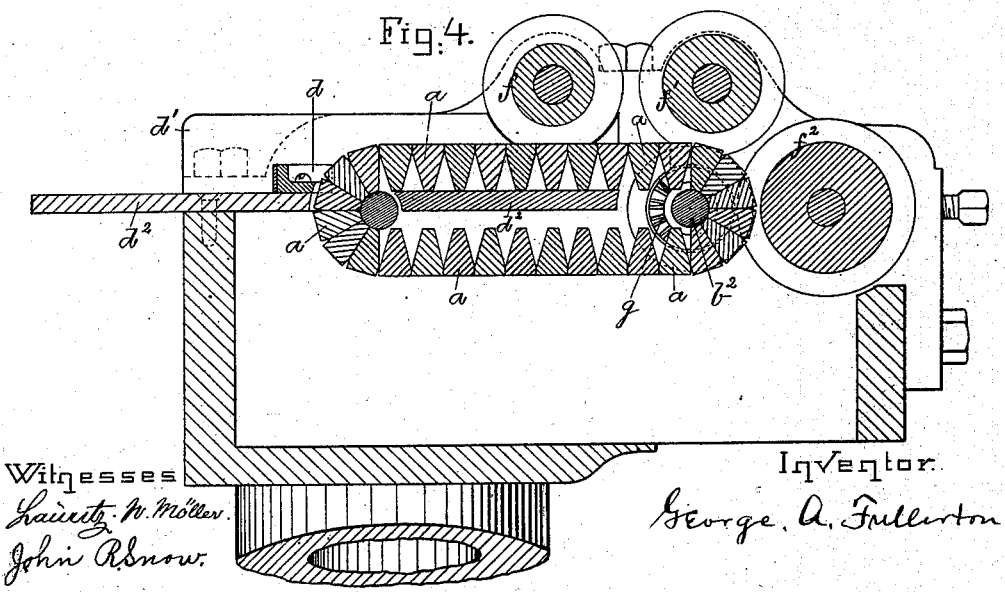

Figure 1 is a plan of my machine, showing the best form now known to me. Fig. 2 is a side elevation. Fig. 3 is a section on line $x\,x$, and Fig. 4 on line $y\,y$, and Fig. 5 on line $z\,z$, Fig. 1. Fig. 6 is a horizontal section of a part of the machine on line $s\,s$, Fig. 7. Fig. 7 is an interior view of one of the side frames, showing the plate $d^2$ and the plate $d'$, as formed with grooves diagonally across its inner end and its arrangement with the pinion $g$ on shaft $b^2$. Fig. 8 is a detail view, showing the side and top of plate $d'$.

My machine is designed mainly to mold a flat blank into a shape approximating the shape of a counter when in the shoe, and is on a new principle, which differs radically from that of any other machine known to me for doing this or any like work.

The chief novelty of my machine is the molding-bed, composed of a series of ribs, $a$, (best seen in Figs. 1, 4, 5, and 6,) which form a bed to receive the blank and give it its curves crosswise of the blank, as the blank is first applied, and which move one after the other in a curved path, while the blank is held firmly upon and moves with them to complete the molding—that is, to curve the blank lengthwise and set the other curves. It is this molding-bed which constitutes the main feature of my invention; and while I have shown in the drawings and fully described below the best means for actuating it, and for feeding and holding the blank to it, I do not wish to limit myself to these means, as I have contemplated other means, and am aware that still others may be used.

In order to give the desired firmness and strength to each rib $a$ of my molding-bed, I make each in one piece with its carrier $a'$, and these carriers I form into an endless chain, as shown in Fig. 3, and mount upon sprocket-wheels $b\,b'$, (see Fig. 3,) so that when the sprocket-wheels are revolved the chain is moved, as will be clear.

The motion of the carriers $a'$ gives a like motion to the ribs $a$. (See Fig. 4.) The guide-plate $d$ and the spring-plate $d'$ form the mouth of the machine, and the counter-blank is inserted between the plate $d'$ and guide-plate $d$, with its lower edge on plate $d^2$, until its forward end is caught by the ribs $a$, (which are preferably toothed, as shown, in order that they may the better nip the blank,) and carried along by the ribs $a$, until its forward upper edge strikes the deflecting cam $f$, and as the blank is thus carried under the cam $f$ it is bent over so that it becomes nearly parallel with the upper surface of the supporting-bed, and this parallelism is increased as it is carried under cam $f'$, and completed by cam $f^2$. Thus, when the counter-blank is fed in with its lower edge upon plate $d^2$ and with its flange-forming portion between plate $d'$ and the ribs $a$, it is carried forward by the motion of ribs $a$, and also firmly held, while it is deflected and forced close upon the outer surface of the ribs $a$, and as the ribs $a$ pass around the shaft $b^2$ it is strained and curved lengthwise, and falls, finished, from the under side of the molding-bed.

Instead of using the flat surface of plate $d'$ to hold the flange-forming portion of the blank until the blank is pressed between the cam $f^2$ and the molding-bed, it is desirable to use instead the cylinder $g$, toothed as shown, and with its axis inclined to the axis of shaft $b^2$, so that its teeth may mesh with those of the ribs $a$, as this device seems to carry the flange-forming portion of the blank around the curve more perfectly than any other.

The plate $d'$ should also be formed with grooves diagonally across its inner end, as shown in Figs. 6, 7, and 8, as these grooves tend to hold the lower edge of the blank down close upon plate $d^2$.

The two sprocket-wheel shafts are driven by gears $h'\,h^2$, which receive motion from gear $h$, and gear $h$ also meshes with the stud-gear $h^3$, which meshes with the gears $h^4$ $h^5$ of the cams $f'$ $f^2$. Cam $f$ is driven by gear $h^6$, which meshes with gear $h^2$. The cams $f$ $f'$ $f^2$ may be stationary instead of revolving; but they are preferably as shown.

What I claim as my invention is—

In a machine for molding counters and other like articles, the molding-bed, above described, composed of ribs $a$, arranged and operating, substantially as described.

GEORGE A. FULLERTON.

Witnesses:
 J. E. MAYNADIER,
 JOHN R. SNOW.